(12) United States Patent
Matsumoto et al.

(10) Patent No.: US 8,013,665 B2
(45) Date of Patent: Sep. 6, 2011

(54) SEMICONDUCTOR DEVICE (75) Inventors: Chikako Matsumoto, Kanagawa (JP); Kiyoshi Kato, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 138 days.

(21) Appl. No.: 11/957,560

(22) Filed: Dec. 17, 2007

(65) Prior Publication Data
US 2008/0273357 A1 Nov. 6, 2008

(30) Foreign Application Priority Data

Dec. 28, 2006 (JP) ................................ 2006-354427

(51) Int. Cl.
G05F 1/10 (2006.01)
G05F 3/02 (2006.01)
(52) U.S. Cl. ........................................ 327/536; 327/530
(58) Field of Classification Search .................. 327/530, 327/536
See application file for complete search history.

(56) References Cited

U.S. PATENT DOCUMENTS

| | | | |
|---|---|---|---|
| 5,691,556 A | 11/1997 | Saito et al. | |
| 5,892,267 A | 4/1999 | Takada | |
| 5,999,425 A * | 12/1999 | Lacey et al. ..................... | 363/60 |
| 6,525,595 B2 | 2/2003 | Oku | |
| 6,549,458 B1 * | 4/2003 | Rao et al. ................. | 365/185.08 |
| 6,888,399 B2 * | 5/2005 | Nakagawa et al. ........... | 327/536 |
| 7,148,740 B2 | 12/2006 | Kobayashi et al. | |
| 7,190,211 B2 * | 3/2007 | Nakagawa et al. ........... | 327/536 |
| 7,362,297 B2 * | 4/2008 | Koyama .......................... | 345/92 |
| 7,627,076 B2 * | 12/2009 | Tobita ............................. | 377/64 |
| 7,671,368 B2 * | 3/2010 | Kwak et al. ..................... | 257/71 |
| 2004/0080500 A1 * | 4/2004 | Koyama ......................... | 345/204 |
| 2005/0133605 A1 | 6/2005 | Koyama et al. | |
| 2005/0206441 A1 | 9/2005 | Kimura | |
| 2006/0119419 A1 * | 6/2006 | Park et al. ...................... | 327/536 |
| 2007/0040548 A1 * | 2/2007 | Sakaguchi et al. .......... | 324/158.1 |
| 2007/0122964 A1 * | 5/2007 | Nakagawa et al. ........... | 438/202 |
| 2007/0195920 A1 * | 8/2007 | Tobita ............................. | 377/64 |
| 2009/0085902 A1 * | 4/2009 | Yamamoto et al. ............ | 345/211 |
| 2010/0111245 A1 * | 5/2010 | Tobita ............................. | 377/64 |
| 2010/0166136 A1 * | 7/2010 | Tobita ............................. | 377/67 |

FOREIGN PATENT DOCUMENTS

| | | |
|---|---|---|
| JP | 2003-297936 | 10/2003 |
| JP | 2004078172 A * | 3/2004 |
| WO | WO 2006/028258 A1 | 3/2006 |

* cited by examiner

*Primary Examiner* — Lincoln Donovan
*Assistant Examiner* — Adam D Houston
(74) *Attorney, Agent, or Firm* — Fish & Richardson P.C.

(57) ABSTRACT

To provide a semiconductor device of which a manufacturing process is simplified and which has a boosting circuit in which the area of a capacitor element is reduced. The present invention includes a plurality of rectifying elements which is connected in series and has a rectifying function from a first input terminal portion to an output terminal portion; a first wiring and a second wiring, which are connected to a second input terminal portion, into which a signal and a signal obtained by inverting the signal are respectively input; and a boosting circuit including a plurality of capacitor elements each having a first electrode, an insulating film, and a second electrode and storing a boosted potential. The plurality of capacitor elements includes a capacitor element in which the first electrode and the second electrode are formed using conductive films, and a capacitor element in which at least the second electrode is formed using a semiconductor film. In the plurality of capacitor elements, at least a capacitor element in a first stage is a capacitor element in which the first electrode and the second electrode are formed using conductive films.

13 Claims, 10 Drawing Sheets

SEMICONDUCTOR DEVICE

BACKGROUND OF THE INVENTION

1. Field of the Invention

The present invention relates to a semiconductor device having a boosting circuit, in particular, a semiconductor device having a boosting circuit which supplies a potential higher than power source voltage.

2. Description of the Related Art

A boosting circuit is used for a variety of purposes, for example, for a CCD driver circuit, an organic EL driver circuit, a low-temperature polysilicon liquid crystal driver circuit, a white light emitting diode driver circuit, an RF circuit, and a multiple power source system. For example, reduction in voltage in a semiconductor device such as a flash memory is accompanied by boosting power source voltage for obtaining high voltage necessary for writing or erasing data. In recent years, a boosting circuit which has a small area and efficiently generates high voltage has been expected in various fields, with the higher integration of integrated circuits of semiconductor devices.

In order to reduce the area of a boosting circuit, use of a MOS capacitor using a semiconductor substrate having a conductivity type or an insulating film having high dielectric constant, as a capacitor (a capacitor element), is proposed (for example, Reference 1: Japanese Published Patent Application No. 2003-297936). In Reference 1, a semiconductor substrate having a conductivity type is used for one of electrodes of a MOS capacitor, and a conductive film corresponding to a gate electrode is used for the other of the electrodes, and an insulating film corresponding to a gate insulating film of a transistor is provided between the two electrodes to increase capacitance per unit area.

SUMMARY OF THE INVENTION

However, in a semiconductor device, in the case where an element such as a boosting circuit is formed using a thin film transistor (hereinafter, also referred to as "TFT") and one of electrodes of a capacitor element is formed using a semiconductor film having a conductivity type, an impurity element is necessary to be selectively introduced into a semiconductor film to be the one of the electrodes of the capacitor element after forming the semiconductor film over a substrate. Thus, there is concern that the number of manufacturing steps is increased or that a semiconductor film into which an impurity element is not introduced is contaminated. Moreover, in the case where a semiconductor film into which an impurity element is not introduced is used for an electrode of the capacitor element, there is a fear that the capacitor element does not serve as a capacitor when voltage applied to one end of the capacitor element (voltage obtained by subtracting threshold voltage of a rectifying element from input voltage) is lower than threshold voltage of the capacitor element of a thin film transistor type.

In view of the foregoing problems, it is an object of the present invention to provide a semiconductor device of which a manufacturing process is simplified and which has a boosting circuit in which the area of a capacitor element is reduced.

A semiconductor device of the present invention includes a plurality of rectifying elements, which is connected in series and has a rectifying function from a first input terminal portion to an output terminal portion; a first wiring and a second wiring, which are connected to a second input terminal portion, into which a signal and a signal obtained by inverting the signal are respectively input; and a boosting circuit including capacitor elements each having a first electrode, an insulating film, and a second electrode. The first electrode is connected to an output portion of a rectifying element of the plurality of rectifying elements and an input portion of another rectifying element of the plurality of rectifying elements, which is adjacent to the rectifying element; the second electrode is connected to the first wiring or the second wiring; the plurality of capacitor elements includes a capacitor element in which the first electrode and the second electrode are formed using conductive films, and a capacitor element in which at least the second electrode is formed using a semiconductor film; and, in the plurality of capacitor elements, at least a capacitor element in a first stage is a capacitor element in which the first electrode and the second electrode are formed using conductive films.

In the above-described structure, the semiconductor device of the present invention can have a structure in which the rectifying element is a diode-connected thin film transistor; and a gate electrode of the thin film transistor, the first electrode of the capacitor element in the first stage, and a first electrode of the capacitor element in which the second electrode is provided using a semiconductor film, are formed using a same material.

A semiconductor device of the present invention includes a plurality of rectifying elements, which is connected in series and includes at least a first rectifying element, a second rectifying element, and a third rectifying element which have a rectifying function from a first input terminal portion to an output terminal portion; a first wiring and a second wiring, which are connected to a second input portion; and a boosting circuit including a plurality of capacitor elements having a first capacitor element provided in a first stage and a second capacitor element provided in a second stage. The plurality of capacitor elements includes a capacitor element in which the first electrode and the second electrode are formed using conductive films, and a capacitor element in which at least the second electrode is formed using a semiconductor film; the first electrode of the first capacitor element is connected to an output portion of the first rectifying element and an input portion of the second rectifying element; the second electrode of the first capacitor element is connected to the first wiring; the first electrode of the second capacitor element is connected to an output portion of the second rectifying element and an input portion of the third rectifying element; the second electrode of the second capacitor element is connected to the second wiring; and at least the first capacitor element is a capacitor element in which the first electrode and the second electrode are formed using conductive films. Further, the second capacitor element may be a capacitor element in which the second electrode is formed using a semiconductor film.

According to the present invention, by providing a capacitor element of a thin film transistor type for each capacitor element of a boosting circuit, the area of the boosting circuit can be reduced. Further, by providing one of electrodes of a capacitor element using a semiconductor film formed in the same step as a semiconductor film forming a channel formation region of a TFT, a step of introducing an impurity element into a semiconductor film is not necessary, a manufacturing process can be simplified, and the number of masks can be reduced, leading to low cost. Furthermore, in capacitor elements in plural stages which are provided for a boosting circuit, by providing at least a capacitor element in a first stage using a capacitor element in which two electrodes are formed using conductive films and providing capacitor elements in other stages using capacitor elements using semiconductor films, electric charge can be stored even in the case where voltage applied to one end of the capacitor element in the first stage is lower than threshold voltage of the capacitor element using a semiconductor film. Thus, the area of the boosting circuit can be reduced and a boosting circuit can operate appropriately.

DETAILED DESCRIPTION OF THE INVENTION

Embodiment modes of the present invention will be explained below with reference to the accompanied drawings. However, the present invention can be implemented in various different modes, and it is to be easily understood that various changes and modifications in modes and details thereof will be apparent to those skilled in the art without departing from the meaning and the scope of the present invention. Therefore, the present invention should not be interpreted as being limited to the description of the embodiment modes to be given below. It is to be noted that, in embodiment of the present invention which will be explained below, the same portions are denoted by the same reference numerals through different drawings.

Embodiment Mode 1

This embodiment mode describes a structural example of a boosting circuit of a semiconductor device of the present invention with reference to the drawings.

A semiconductor device described in this embodiment mode includes a boosting circuit formed by using a capacitor element in which an insulating film is provided between two conductive films and a capacitor element of a thin film transistor type. A capacitor element of a thin film transistor type refers to a capacitor element including a second electrode formed using a semiconductor film corresponding to a semiconductor film forming a channel formation region of a TFT; an insulating film formed using an insulating film corresponding to a gate insulating film of the TFT; and a first electrode formed using a conductive film corresponding to a gate electrode of the TFT. The capacitor element of a thin film transistor type is formed in the same step as a TFT serving as a switch or the like provided for another integrated circuit in a semiconductor device. Hereinafter, a specific structure of a semiconductor device equipped with a boosting circuit described in this embodiment mode is described.

A boosting circuit in a semiconductor device described in this embodiment mode is formed by combining a capacitor element (bipolar) in which an insulating film is provided between two conductive films, and a capacitor element (unipolar) of a thin film transistor type in which at least one of electrodes is formed using a semiconductor film. Here, the boosting circuit includes a first input terminal portion 101, a second input terminal portion 102, an output terminal portion 103, a first capacitor element $205\_{}_1$ to an n-th capacitor element $205\_{}_n$, a first diode $104\_{}_1$ to an n-th diode $104\_{}_n$, and an inverter 106. The first diode $104\_{}_1$ to the n-th diode $104\_{}_n$ are connected in series and are rectifying elements have a function of rectifying current from the first input terminal portion 101 to the output terminal portion 103. Here, the first input terminal portion 101 is connected to one of electrodes of the first diode $104\_{}_1$, and the other of the electrodes of the first diode $104\_{}_1$ is connected to one of electrodes of the second diode $104\_{}_2$ and an electrode of the first capacitor element $205\_{}_1$ (see FIG. 1).

Figure 1:
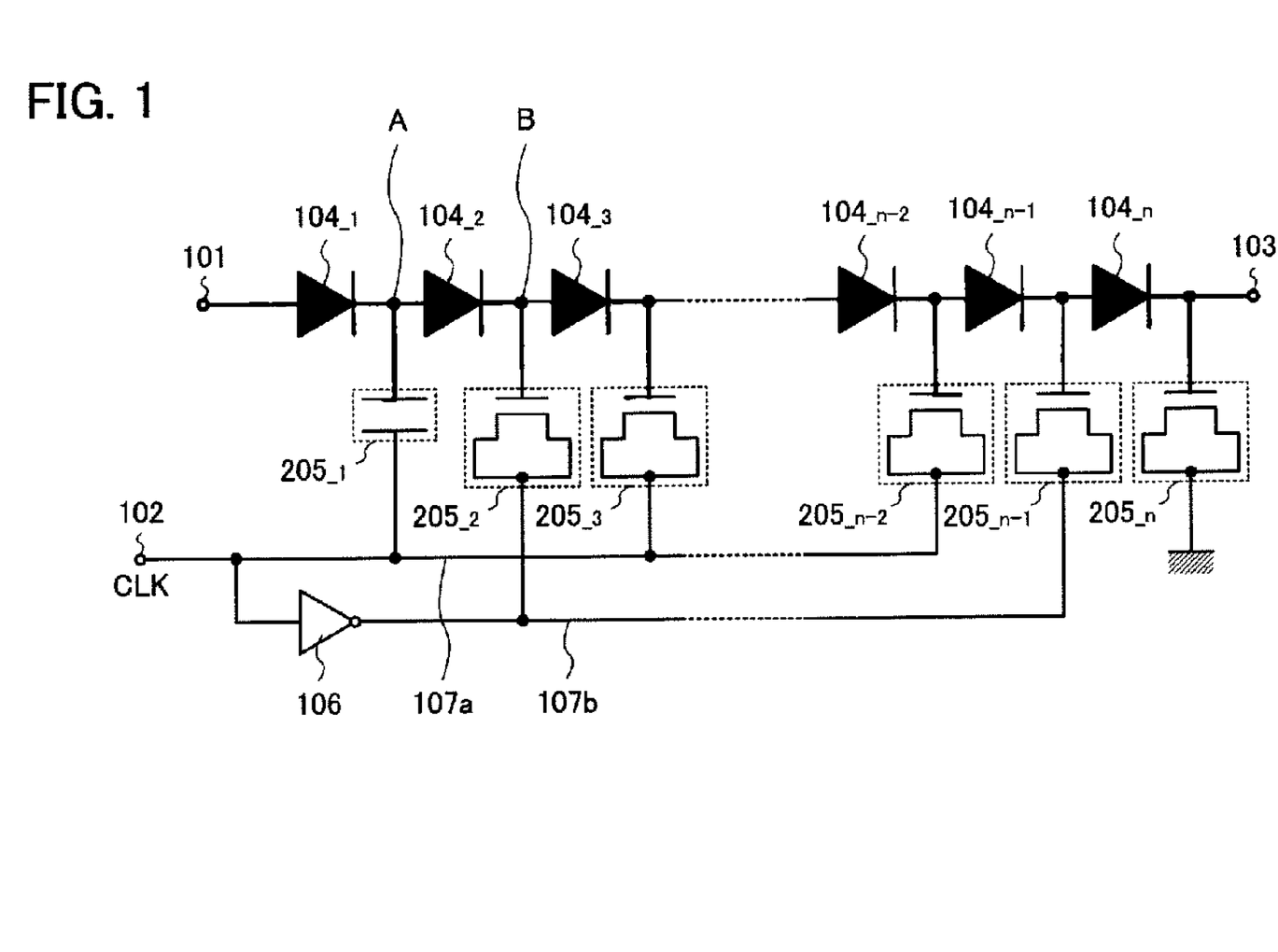
FIG. 1 is a diagram showing an example of a semiconductor device of the present invention.

Further, in the structure shown in FIG. 1, the capacitor element of a thin film transistor type has a structure in which one of electrodes (a second electrode) is formed using a semiconductor film and the other of the electrodes (a first electrode) is formed using a conductive film. Specifically, the second electrode is formed using a semiconductor film corresponding to a semiconductor film forming a channel formation region of a TFT which is provided for another integrated circuit; the first electrode is formed using a conductive film corresponding to a gate electrode of the TFT; and the insulating film is formed using an insulating film corresponding to a gate insulating film of the TFT. Accordingly, a step of introducing an impurity element into a semiconductor film to be the second electrode is not necessary, and thus, a manufacturing process can be simplified.

The second input terminal portion 102 is connected to a first wiring 107a and a second wiring 107b. The first wiring 107a is connected to one of electrodes of each of the capacitor elements in odd-numbered stages, such as the first capacitor element $205\_{}_1$ and the third capacitor element $205\_{}_3$. The second wiring 107b is connected to one of the electrodes of each of the capacitor elements in even-numbered stages, such as the second capacitor element $205\_{}_2$ and the fourth capacitor element $205\_{}_4$.

Predetermined voltage (for example, power source voltage) is input to the first input terminal portion 101, and boosted voltage is output from the output terminal portion 103. A clock signal is input to the second input terminal portion 102, and a signal ("High" or "Low") and a signal obtained by inverting the signal by the inverter 106 are input to the first wiring 107a and the second wiring 107b, respectively. Accordingly, periodically, one of "High" and "Low" is applied to one of the electrodes of each of the capacitor elements in the odd-numbered stages (the first capacitor element $205\_{}_1$, the third capacitor element $205\_{}_3$, and the like) connected to the first wiring 107a, and the other of "High" and "Low" is applied to one of the electrodes of each of the capacitor elements in the even-numbered stages (the second capacitor element $205\_{}_2$, the fourth capacitor element $205\_{}_4$, and the like) connected to the second wiring 107b.

Here, in order to input a clock signal and a clock signal obtained by inverting the clock signal (phases thereof are different from each other by 180°) to the first wiring 107a and the second wiring 107b, respectively, the inverter 106 is provided so as to be connected to the second input terminal portion 102 and one of the electrodes of the second capacitor element 205$_2$. Alternatively, a structure may be employed, in which clock signals having different phases are input without providing the inverter 106.

In the boosting circuit described in this embodiment mode, at least a capacitor element in a first stage (here, the first capacitor element 205$_1$) has a structure in which an insulating film is formed between a first conductive film and a second conductive film, and other capacitor elements (here, the second capacitor element 205$_2$ to the n-th capacitor element 205$_n$) each have a structure of a thin film transistor type. This is because in the case where the first capacitor element 205$_1$ is formed using a capacitor element of a thin film transistor type, there is a problem in that the capacitor element 205$_1$ does not serve as a capacitor when voltage applied to one end of the capacitor element of a thin film transistor type (voltage obtained by subtracting threshold voltage of the rectifying element from input voltage) is lower than threshold voltage of the capacitor element of a thin film transistor type. It is to be noted that in this specification, a capacitor element in a first stage refers to a capacitor element in which the lowest potential is stored among a plurality of capacitor elements provided for a boosting circuit. Here, the first capacitor element 205$_1$, which is connected to an output portion of the first diode 104$_1$ which is a diode in the first stage and is connected to the first input terminal portion 101 and an input portion of the second diode 104$_2$, is the capacitor element in the first stage. Alternatively, a structure may be employed, in which the capacitor element in the first stage is connected to not an output portion but an input portion of the first diode 104$_1$.

As described above, the boosting circuit is provided with not only a capacitor element having a structure in which an insulating film is provided between a first conductive film and a second conductive film but also a capacitor element of a thin film transistor type. Accordingly, the insulating film forming the capacitor element can be formed to be thinned, and thus, the area of the capacitor element can be reduced. Further, by providing a capacitor element of a thin film transistor type, a step of introducing an impurity element into a semiconductor film overlapping with the other of electrodes in advance can be omitted, and thus, a process can be simplified, which leads to low cost. That is, with the structure shown in FIG. 1, reduction in area of the capacitor element and appropriate operation of the boosting circuit can be realized.

In this embodiment mode, at least the first capacitor element 205$_1$ has a structure in which an insulating film, which is different from a gate insulating film, is formed between conductive films. In the case where the first capacitor element 205$_1$ and other capacitor elements (here, the second capacitor element 205$_2$ to the n-th capacitor element 205$_n$) have the same capacitance, the first capacitor element 205$_1$ and the second capacitor element 205$_2$ have different element areas. In general, a gate insulating film is thinner than an insulating film which is different from a gate insulating film, and the first capacitor element 205$_1$ becomes larger in area than the second capacitor element 205$_2$.

Further, the first diode 104$_1$ to the n-th diode 104$_n$ may be elements each having a rectifying function, and each of the first diode 104$_1$ to the n-th diode 104, can be formed using, for example, a PN diode, a PIN diode, a Schottky diode, a MIM (metal insulator metal) diode, a MIS (metal insulator semiconductor) diode, a diode-connected transistor, or the like.

Next, operation of the boosting circuit of the semiconductor device of this embodiment mode is briefly described with reference to FIG. 1.

The boosting circuit shown in FIG. 1 is a circuit including n pieces of the diodes 104$_1$ to 104$_n$, n pieces of the capacitor elements 205$_1$ to 205$_n$, and the inverter 106, and can obtain output voltage of (VIN−VF)×n by inputting a clock signal, given that VIN is input voltage and VF is forward voltage of the diode. The clock signal which is output from the second input terminal portion 102 is input to one end of each of the capacitor elements 205$_1$ and 205$_3$. Further, the clock signal which is output from the second input portion 102 and then inverted by the inverter 106 is input to one end of the capacitor element 205$_2$. An anode for the diode 104$_2$ is denoted by A, and a cathode for the diode 104$_2$ is denoted by B. Electric charge is supplied to each of the anode A and the cathode B with the use of the clock signal and the clock signal obtained by inverting the clock signal, respectively. When a potential different between the anode A and the cathode B exceeds the forward voltage VF of the diode, current flows, whereby voltage on the cathode side is boosted. At this time, the boosted voltage is (VIN−VF). In the case where a plurality of circuits is connected in series, output voltage is boosted by (VIN−VF) in every stage. In FIG. 1, n stages of circuits are connected in series; thus, output voltage is increased by (VIN−VF)×n. In this manner, the circuit shown in FIG. 1 serves as a boosting circuit.

Figure 2:
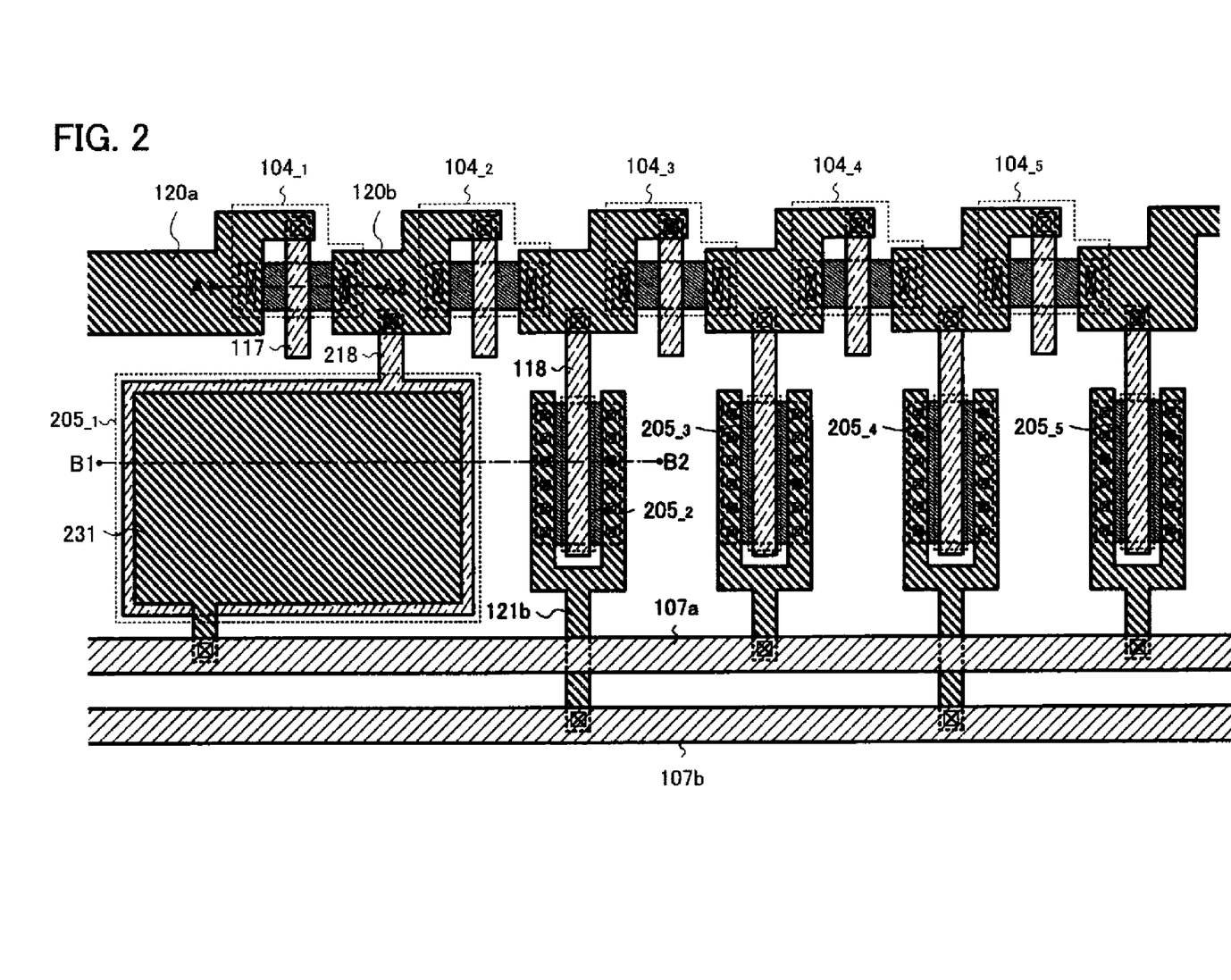
FIG. 2 is a view showing an example of a semiconductor device of the present invention.
Figure 3:
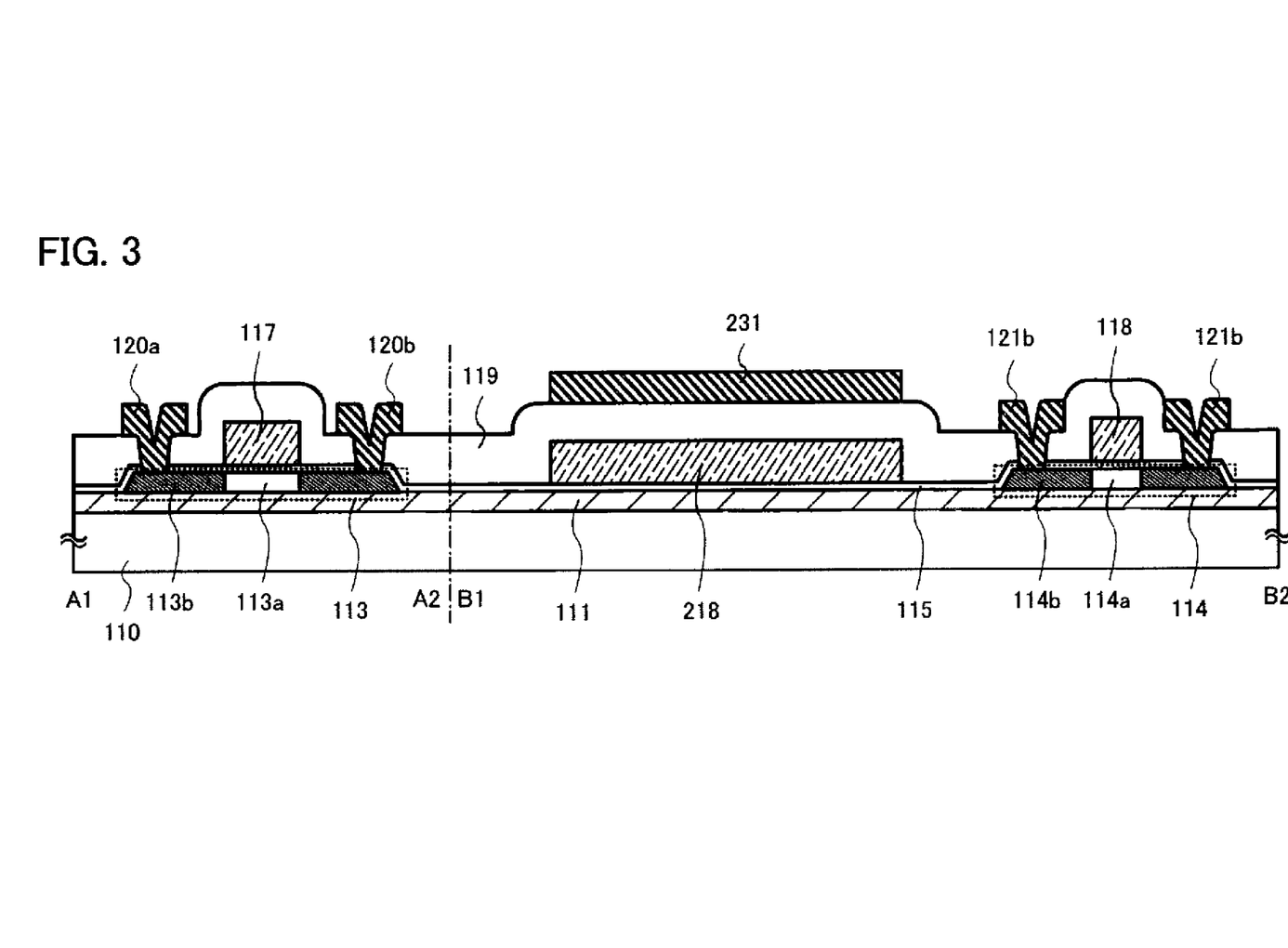
FIG. 3 is a view showing an example of a semiconductor device of the present invention.

Next, a specific structure of the boosting circuit of the semiconductor device of the present invention is described with reference to FIGS. 2 and 3. FIG. 2 is a schematic view of a top view of the boosting circuit of the semiconductor device, and FIG. 3 is a schematic view of a cross-sectional view taken along lines A1-A2 and B1-B2 in FIG. 2. FIGS. 2 and 3 show the case where the diodes in FIG. 1 are formed using diode-connected thin film transistors.

The semiconductor device shown in FIGS. 2 and 3 includes semiconductor films 113 and 114 provided to have island-like shapes over a substrate 110 with an insulating film 111 interposed between the semiconductor films 113 and 114, and the substrate 110; conductive films 117 and 118 provided over the semiconductor films 113 and 114 with a gate insulating film 115 interposed between the conductive films 117 and 118 and the semiconductor films 113 and 114; a first conductive film 218 provided over the gate insulating film 115; an insulating film 119 provided to cover the gate insulating film 115 and the conductive films 117 and 118; and conductive films 120a, 120b, and 121b, and a second conductive film 231 provided over the insulating film 119.

The semiconductor film 113 includes a channel formation region 113a provided below the conductive film 117, and impurity regions 113b which are provided to be separated from each other by the channel formation region 113a. The conductive films 120a and 120b are electrically connected to the impurity regions 113b which are provided to be separated from each other. One of the impurity regions 113b which are provided to be separated from each other may be referred to as a source region or a drain region, and one of the conductive films 120a and 120b may be referred to as source electrode or a drain electrode.

In a thin film transistor including the semiconductor film 113, the gate insulating film 115, and the conductive film 117 serving as a gate electrode, the conductive film 117 and the conductive film 120a serving as a source electrode or a drain electrode are electrically connected to each other, and the thin film transistor serves as a diode. The conductive film 120a corresponds to one of the electrodes of the first diode 104$_1$ in FIG. 1, and the conductive film 120b corresponds to the other of the electrodes of the first diode 104$_1$ in FIG. 1.

The semiconductor film 114 includes a region 114a provided below the conductive film 118, and impurity regions 114b which are provided to be separated from each other by the region 114a. The conductive film 121b is electrically connected to the impurity regions 114b which are provided to be separated from each other. The impurity regions 114b provided to be separated from each other are provided at the same time as the impurity regions 113b serving as a source region and a drain region of the semiconductor film 113.

In the semiconductor film 114, the region 114a is formed in the same step as the channel formation region 113a of the semiconductor film 113. Therefore, the region 114a and the channel formation region 113 include almost the same impurity element.

In the capacitor element of a thin film transistor type including the semiconductor film 114, the gate insulating film 115, and the conductive film 118, the conductive film 121b connected to the impurity regions 114b which are provided to be separated from each other is provided. The semiconductor film 114 corresponds to the second electrode of each of the second capacitor element $205\_2$ to the n-th capacitor element $205\_n$ in FIG. 1. The conductive film 118 corresponds to the first electrode of each of the second capacitor element $205\_2$ to the n-th capacitor element 205, in FIG. 1. The impurity regions 114b of the semiconductor film 114 are electrically connected to the second wiring 107b through the conductive film 121b.

The first capacitor element $205\_1$ can be formed using the first conductive film 218, the insulating film 119, and the second conductive film 231. The first conductive film 218 can be formed using the same material as the conductive film 117 and the conductive film 118, and the second conductive film 231 can be formed using the same material as the conductive films 120a, 120b, and 121b.

As described above, by using a gate insulating film as an insulating film of a capacitor element, the area of the capacitor element can be reduced, whereby the semiconductor device can be made smaller. In the case where a capacitor element of a thin film transistor type is used, one of electrodes thereof is formed using a semiconductor film corresponding to a semiconductor film forming a channel formation region of a TFT provided for an integrated circuit, whereby a manufacturing process can be simplified and the number of masks can be reduced, which leads to low cost. In the case where a capacitor element in which two electrodes are formed using conductive films and a capacitor element of a thin film transistor type in which one of electrodes is formed using a semiconductor film are combined, at least a capacitor element in a first stage is provided to have a structure in which two electrodes are provided using conductive films, whereby reduction in area of the capacitor element and appropriate operation of the boosting circuit can be realized.

Figure 4:
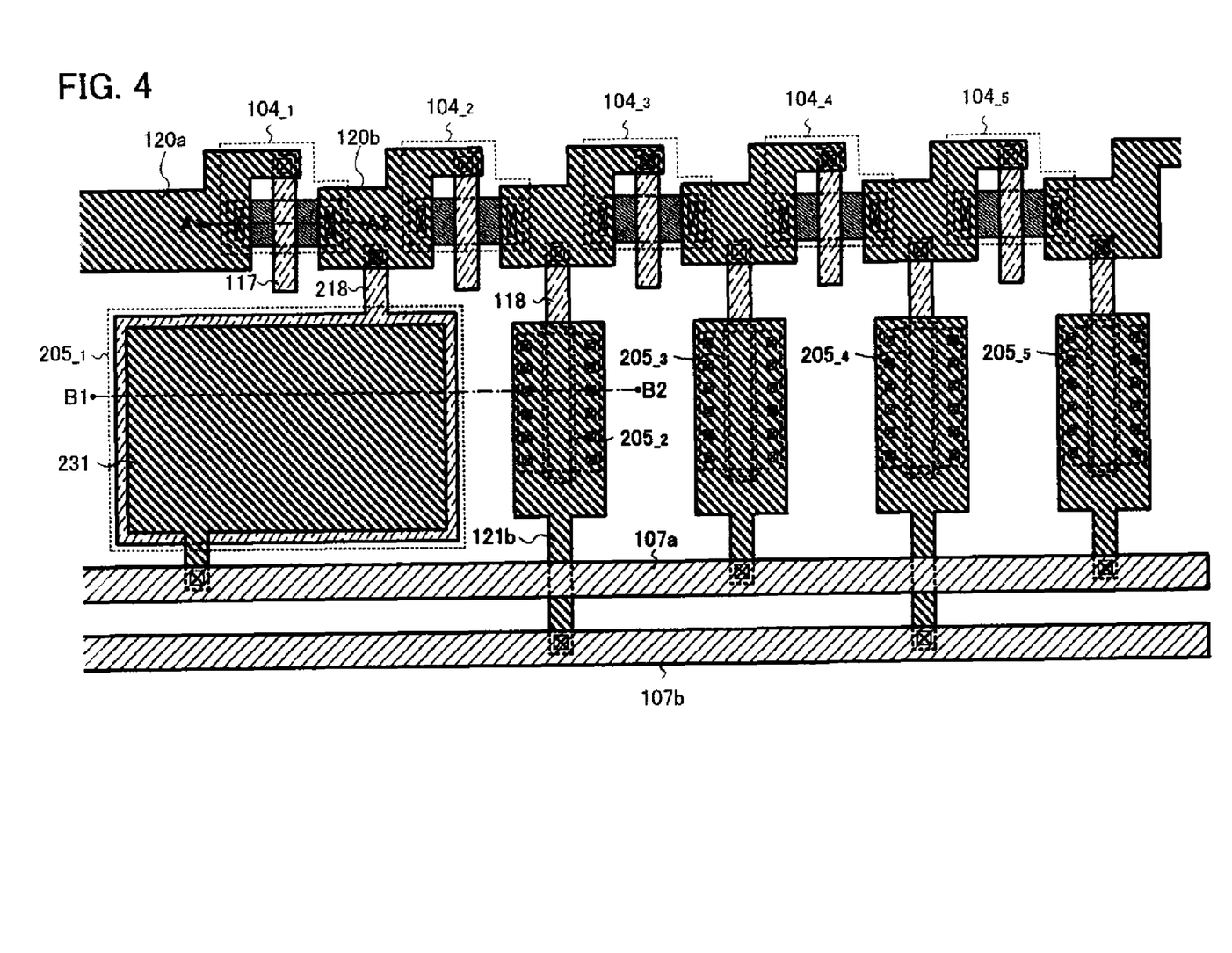
FIG. 4 is a view showing an example of a semiconductor device of the present invention.
Figure 5:
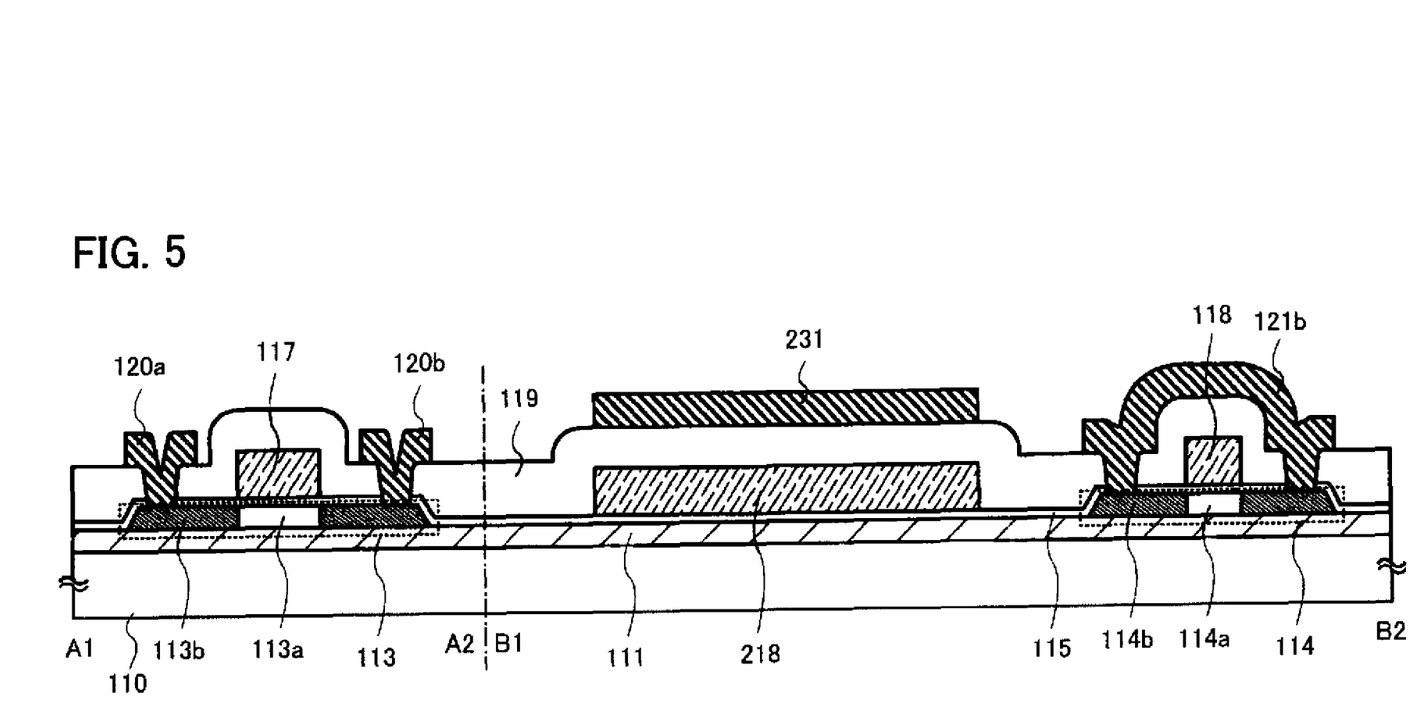
FIG. 5 is a view showing an example of a semiconductor device of the present invention.

It is to be noted that, although FIGS. 2 and 3 show the case where the conductive film 121b electrically connected to the impurity regions 114b does not overlap with the conductive film 118, the conductive film 121b may be provided to cover the conductive film 118 (see FIGS. 4 and 5). In this case, reduction in area of the capacitor element and improvement in characteristics due to increase in capacitance are possible. FIG. 4 is a schematic view of a top view of a boosting circuit of a semiconductor device, and FIG. 5 is a schematic view of a cross-sectional view taken along lines A1-A2 and B1-B2 in FIG. 4.

The structure of the semiconductor device described in this embodiment mode can be implemented by being freely combined with the structures of the semiconductor devices in other embodiment modes in this specification.

Embodiment Mode 2

In this embodiment mode, a method of manufacturing a semiconductor device in the above-described embodiment mode is described with reference to FIGS. 6A to 7C.

Figure 6A:
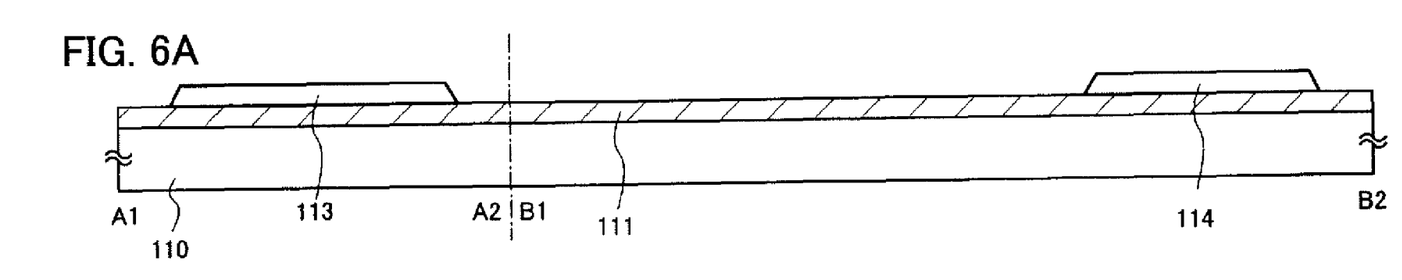
FIGS. 6A to 6C are views showing an example of a method for manufacturing a semiconductor device of the present invention.

First, an insulating film 111 which serves as a base is formed over a substrate 110. The substrate 110 may be a glass substrate, a quartz substrate, a metal or stainless steel substrate which has an insulating film formed over one surface, a plastic substrate which has sufficient heat resistance to withstand processing temperatures of this process, or the like. When such a substrate 110 is used, there are no large restrictions on its area or shape; therefore, when, for example, a rectangular substrate which has a side of one meter or more is used as the substrate 110, productivity can be improved markedly. A merit such as this is a large advantage compared with the case of using a circular silicon substrate. In the case of providing a circuit necessary to be operated at high speed, an SOI substrate (Silicon On Insulator) substrate may be used. Further, when a separation layer is used between the substrate 110 and the insulating film 111, a layer having a thin film transistor can be transposed to a substrate over which a conductive film or the like is formed, and as a result, a connection between a conductive film which is connected to the thin film transistor, and the conductive film which is over the substrate to which the conductive film is transposed, can be simplified.

A layer which includes an oxide of silicon or a nitride of silicon is formed as the insulating film 111 using a sputtering method, a plasma CVD method, or the like. An oxide of silicon is a material which includes silicon (Si) and oxygen (O), and corresponds to silicon oxide, silicon oxynitride, silicon nitride oxide, and the like. A nitride of silicon is a material which includes silicon and nitrogen (N), and corresponds to silicon nitride, silicon oxynitride, silicon nitride oxide, and the like. The insulating film which serves as the base may be a single layer or a stack of layers. For example, in the case where the insulating film which serves as the base has a two-layer structure, a silicon nitride oxide layer is formed as a first layer and a silicon oxynitride layer is formed as a second layer. Alternatively, in the case where the insulating film which serves as the base has a three-layer structure, a silicon oxide layer may be formed as a first insulating film, a silicon nitride oxide layer may be formed as a second insulating film, and a silicon oxynitride layer may be formed as a third insulating film. Alternatively, a silicon oxynitride layer may be formed as a first insulating film, a silicon nitride oxide layer may be formed as a second insulating film, and a silicon oxynitride layer may be formed as a third insulating film. The insulating film which serves as the base functions as a blocking film which prevents penetration of impurities from the substrate 110.

Next, an amorphous semiconductor film (for example, a layer including amorphous silicon) is formed over the insulating film 111. The amorphous semiconductor film is formed to a thickness of 25 to 200 nm (preferably 30 to 150 nm) using a sputtering method, an LPCVD method, a plasma CVD method, or the like. Next, the amorphous semiconductor film is crystallized using a laser crystallization method, a thermal crystallization method which employs RTA or an annealing furnace, a thermal crystallization method which employs a metal element which promotes crystallization, a method in which a laser crystallization method is combined with a thermal crystallization method which employs a metal element which promotes crystallization, or the like to form a crystalline semiconductor film. Subsequently, the obtained crystalline semiconductor film is patterned into a desired shape to form crystalline semiconductor films 113 and 114 (see FIG. 6A).

Briefly describing an example of a manufacturing process for the crystalline semiconductor films 113 and 114, first, a plasma CVD method is used to form an amorphous semiconductor film with a thickness of 66 nm. Next, a solution which includes nickel, which is a metal element that promotes crystallization, is retained on the amorphous semiconductor film, and the amorphous semiconductor film is then subjected to dehydrogenation treatment (at 500° C. for one hour) and thermal crystallization treatment (at 550° C. for four hours) to form a crystalline semiconductor film. Subsequently, laser light irradiation is performed as necessary and patterning treatment which employs a photolithography method is performed, whereby the crystalline semiconductor films 113 and 114 are formed. In the case of using a laser crystallization method to form the crystalline semiconductor films, a continuous wave or pulsed gas laser or solid-state laser is used. As a gas laser, an excimer laser, a YAG laser, a $YVO_4$ laser, a YLF laser, a $YAlO_3$ laser, a glass laser, a ruby laser, a Ti:sapphire laser, or the like is used. As a solid state laser, a laser which employs a crystal, such as YAG, $YVO_4$, YLF, or $YAlO_3$, which is doped with Cr, Nd, Er, Ho, Ce, Co, Ti, or Tm is used.

Further, when a metal element which promotes crystallization is used to crystallize the amorphous semiconductor film, while there are advantages in that crystallization can be performed at a low temperature in a short period of time and the direction of crystals is uniform, there are also drawbacks in that because metal element remains on the crystalline semiconductor film, off-state current increases and TFT characteristics are not stable. Therefore, preferably an amorphous semiconductor film which functions as a gettering site is formed over the crystalline semiconductor film. Since it is necessary to include an impurity element such as phosphorus or argon in the amorphous semiconductor film which serves as the gettering site, preferably the amorphous semiconductor layer is formed using a sputtering method by which argon can be included in the amorphous semiconductor layer at a high concentration. Then, heat treatment (an RTA method, thermal annealing which employs an annealing furnace, or the like) is performed and the metal element is diffused into the amorphous semiconductor film. Subsequently, the amorphous semiconductor film which includes the metal element is removed. Thus, the amount of metal element included in the crystalline semiconductor film can be reduced or metal element included in the crystalline semiconductor film can be removed from the crystalline semiconductor film.

Figure 6B:
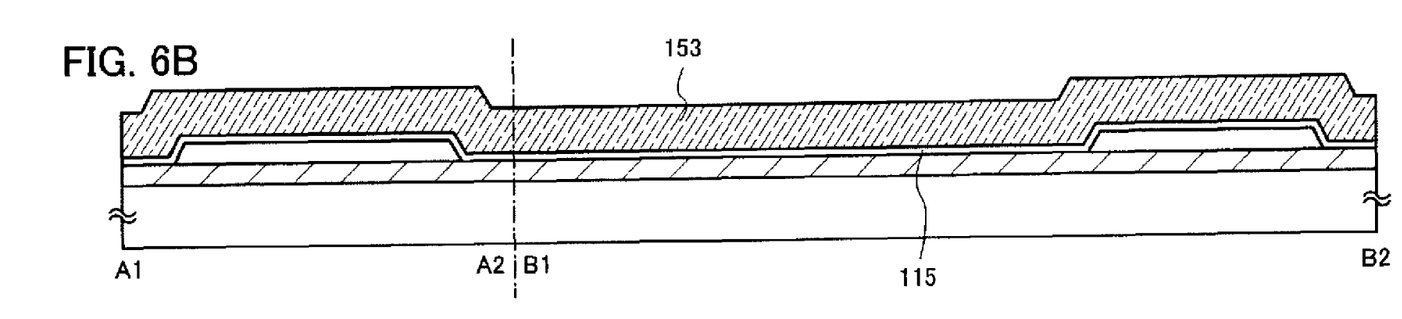

Next, a gate insulating film 115 which covers the crystalline semiconductor films 113 and 114 is formed. The gate insulating film 115 includes an oxide of silicon or a nitride of silicon and is formed by a plasma CVD method, a sputtering method, or the like as a single layer or a stack of layers. Specifically, a layer including silicon oxide, a layer including silicon oxynitride, or a layer including silicon nitride oxide is formed as a single layer, or such layers are used to form a stack of layers.

Next, a first conductive film and a second conductive film are stacked over the gate insulating film 115 (see FIG. 6B). The first conductive film is formed to a thickness of 20 to 100 nm by a plasma CVD method, a sputtering method, or the like. The second conductive film is formed to a thickness of 100 to 400 nm by a plasma CVD method, a sputtering method, or the like. The first conductive film and the second conductive film are formed using any one of the elements tantalum (Ta), tungsten (W), titanium (Ti), molybdenum (Mo), aluminum (Al), copper (Cu), chromium (Cr), niobium (Nb), and the like, or of an alloy material or a compound material which includes such an element as a main constituent. Alternatively, they may be formed of a semiconductor material typified by polycrystalline silicon doped with an impurity element such as phosphorus. Examples which can be given of combinations of the first conductive film and the second conductive film include a tantalum nitride layer and a tungsten (W) layer, a tungsten nitride layer and a tungsten layer, a molybdenum nitride layer and a molybdenum (Mo) layer, and the like. Tungsten and tantalum nitride have high heat resistance, so when they are used to form the first conductive film and the second conductive film, subsequent to the formation of the two layers, heat treatment for thermal activation can be performed. Further, in the case of employing a three-layer structure rather than a two-layer structure, a stacked structure which includes a molybdenum layer, an aluminum layer, and another molybdenum layer may be used.

Figure 6C:
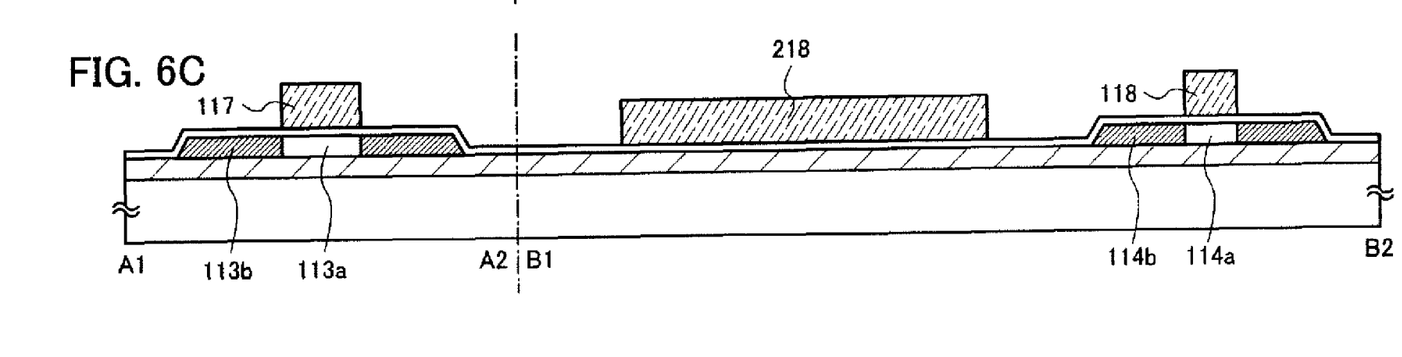

Next, a resist mask is formed by a photolithography method, and an etching treatment is performed on the first conductive film and the second conductive film to form conductive films 117 and 118 which serve as gate electrodes and a conductive film 218 serving as a first electrode of a capacitor element (see FIG. 6C).

Next, a resist mask is formed by a photolithography method, and desired n-type or p-type impurity regions 113b and 114b, a channel forming region 113a, and a region 114a are formed in the crystalline semiconductor films 113 and 114 using an ion doping method or an ion implantation method. For example, in the case of imparting n-type conductivity, an element which belongs to Group 15 of the periodic table may be used as an impurity element which imparts n-type conductivity. For example, phosphorus (P) or arsenic (As) is used as an impurity element and is added to form n-type impurity regions. Further, in the case of imparting p-type conductivity, a resist mask is formed using a photolithography method, and an impurity element which imparts p-type conductivity, for example, boron (B), is added to a desired crystalline semiconductor film to form a p-type impurity region.

Figure 7A:
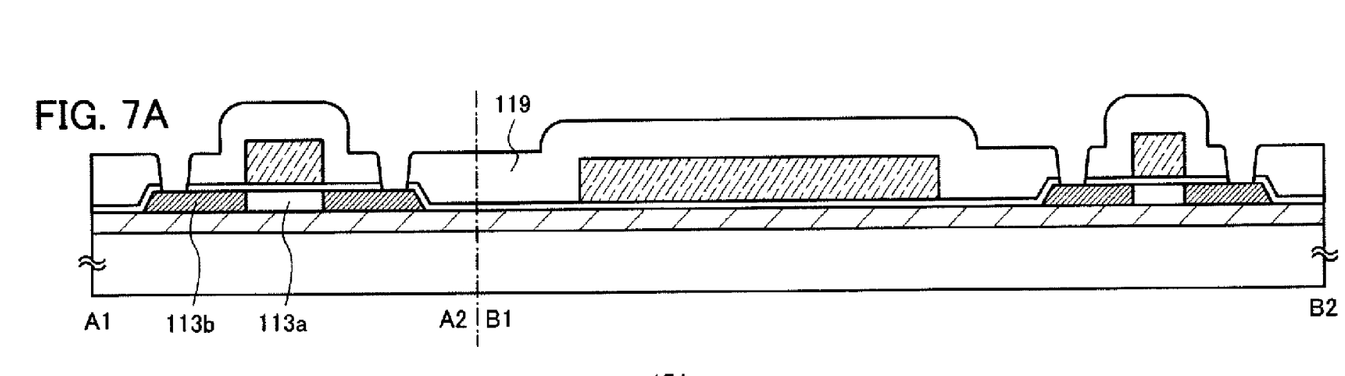
FIGS. 7A to 7C are views showing an example of a method for manufacturing a semiconductor device of the present invention.

Next, an insulating film 119 is formed so as to cover the gate insulating film 115 and the conductive films 117 and 118. The insulating film 119 is formed by a sputtering method, a CVD method, an SOG method, a droplet discharge method, or the like, using an inorganic material such as an oxide of silicon or a nitride of silicon; an organic material such as a polyimide, a polyamide, benzocyclobutene, an acrylic, an epoxy, or a siloxane; or the like. Siloxane has a skeleton structure formed of bonds between silicon (Si) and oxygen (O). An organic group containing at least hydrogen (for example, an alkyl group or an aromatic hydrocarbon) is used as a substituent. A fluoro group may also be used as a substituent. Alternatively, a fluoro group and an organic group containing at least hydrogen may be used as a substituent. Further, the insulating film which covers the gate insulating film and the conductive films may be a single layer or a stack of layers. When a three-layer structure is used, a layer including silicon oxide may be formed as a first layer of the insulating film, a layer including a resin may be formed as a second layer of the insulating film, and a layer including silicon nitride may be formed as a third layer of the insulating film.

Note that before forming the insulating film 119, or after forming one or more thin films of the insulating film 119, heat treatment for restoring the crystallinity of the semiconductor films, activating an impurity element which has been added to the semiconductor films, or hydrogenating the semiconductor films may be performed. As the heat treatment, thermal annealing, a laser annealing method, an RTA method, or the like may be used.

Then, the insulating film 119 is etched by a photolithography method to form contact holes which expose the impurity regions 113b and 114b (see FIG. 7A). Subsequently, a conductive film 154 is formed so that the contact holes are filled (see FIG. 7B).

Figures 7B, 7C:
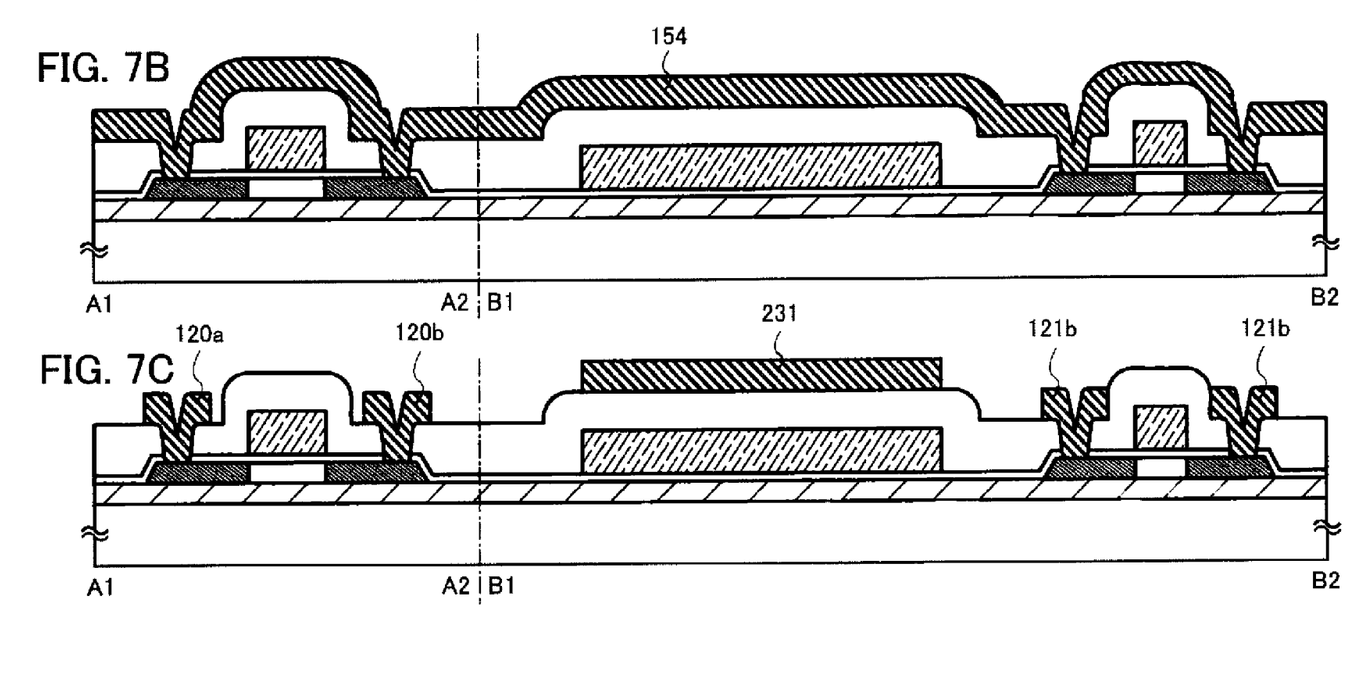

The conductive film 154 is formed as a single layer or as stacked layers by a plasma CVD method, a sputtering method, or the like using any of the elements titanium (Ti), aluminum (Al), or neodymium (Nd), or an alloy material or a compound material which contains one of the above-mentioned elements as its main constituent. An alloy material containing aluminum as its main constituent corresponds to, for example, a material which has aluminum as its main constituent and includes nickel, or an alloy material which has aluminum as its main constituent and includes nickel and one or both of carbon and silicon. The conductive films 120a to 121b may employ, for example, a stacked layer structure which includes a barrier layer, an aluminum-silicon (Al—Si) layer, and another barrier layer; or a stacked layer structure which includes a barrier layer, an aluminum-silicon (Al—Si) layer, a titanium nitride layer, and another barrier layer. Note that a barrier layer corresponds to a thin film formed from titanium, a nitride of titanium, molybdenum, or a nitride of molybdenum. Aluminum and aluminum silicon have low resistance and are inexpensive; therefore, they are ideal materials for forming the conductive films 120a to 121b. Further, formation of a hillock of aluminum or aluminum silicon can be prevented when upper and lower barrier layers are provided. Further, when a barrier layer is formed from titanium, which is a highly reducible element, even when a thin natural oxide film forms over the crystalline semiconductor film, the natural oxide film is reduced, and therefore good contact with the crystalline semiconductor film can be obtained.

Next, the conductive film 154 is selectively etched to form conductive films 120a, 120b, 121a, and 121b, each of which serves as a source electrode or a drain electrode, and a conductive film 231 serving as a second electrode of the capacitor element (see FIG. 7C).

Through the above-described steps, a semiconductor device is obtained, which includes a thin film transistor having the semiconductor film 113, the insulating film 115 to be a gate insulating film, and the conductive film 117 to be a gate electrode; a capacitor element having the conductive film 218 to be a first electrode, the insulating film 119, and the conductive film 231 to be a second electrode; and a capacitor element of a thin film transistor type, which has the semiconductor film 114 to be a second electrode, the insulating film 115, and the conductive film 118 to be a first electrode.

As described in this embodiment mode, a thin film transistor, a capacitor element of a thin film transistor type, and a capacitor element in which two electrodes are formed using conductive films, can be manufactured in the same steps.

Embodiment Mode 3

This embodiment mode describes a structure of a semiconductor device which can transmit and receive information wirelessly (also referred to as an RFID (radio frequency identification system) tag, an RF tag, an ID tag, an IC tag, a wireless tag, an electronic tag, or a wireless chip) and has a memory with a built-in boosting circuit in the above-described embodiment mode, with reference to the drawings.

The semiconductor device described in this embodiment mode has features such as capability of transmitting and receiving information with an external device (a reader/writer) without contact, operation without battery, and superiority in durability and weatherability. A memory is often mounted on such a semiconductor device to improve its function.

One feature of the semiconductor device described in this embodiment mode is that reading and writing data are possible without contact. Transmission formats of data are roughly classified into three types, which are: an electromagnetic coupling type which conducts communication through mutual induction by positioning a pair of coils so as to face each other; an electromagnetic induction type which conducts communication through an induction field; and a radio wave type which conducts communication by utilizing radio waves. Any type may be used. Moreover, an antenna used for the data transmission can be provided in two ways: one is that the antenna is provided over a substrate where a plurality of elements and a memory element are provided, and the other is that a terminal portion is provided over a substrate where a plurality of elements and a memory element are provided and an antenna provided over another substrate is connected to the terminal portion.

Figure 8:
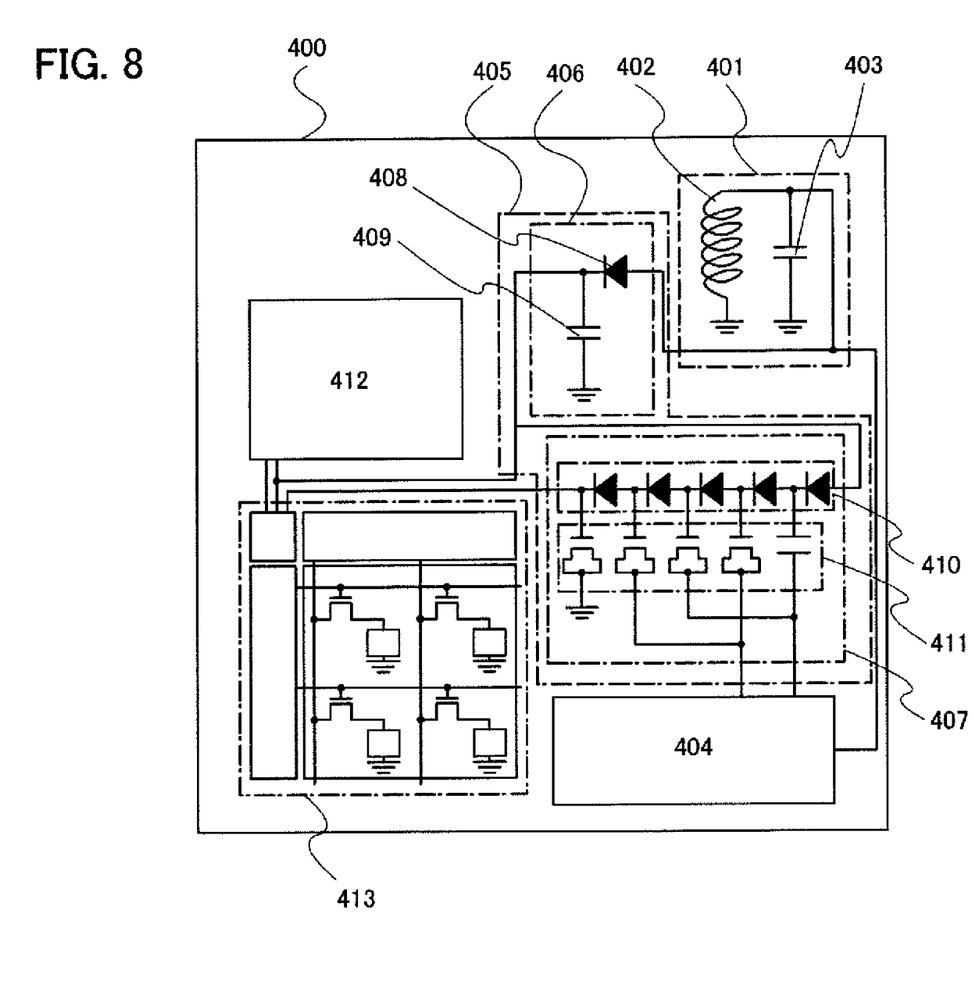
FIG. 8 is a diagram showing an example of a semiconductor device of the present invention.

This embodiment mode describes a structural example of a semiconductor device of a case of providing an antenna over a substrate provided with a plurality of elements and a memory element, with reference to FIG. 8.

A semiconductor device shown in FIG. 8 includes an antenna circuit 401, a clock generation circuit 404, a power supply circuit 405, a control circuit 412, and a memory circuit 413 over a substrate 400. The antenna circuit 401 includes an antenna 402 and a resonant capacitor 403, and the power supply circuit 405 includes a smoothing circuit 406 and a boosting circuit 407. The smoothing circuit 406 includes a diode 408 which rectifies an alternating signal, and a smoothing capacitor 409, and the boosting circuit 407 includes a group of diodes 410 for boosting voltage, and a group of capacitor elements 411. In addition to these circuits, a data modulation/demodulation circuit, a sensor, and the like may be included.

In order to perform operation of writing data to the memory circuit, second voltage, which is higher than voltage used at the time of reading, is necessary to be applied. As a method for generating the second voltage, a method for boosting voltage (first voltage) obtained by smoothing a signal received by an antenna with the use of a boosting circuit, can be used. By particularly applying the structure of the semiconductor device in the above-described embodiment mode, the circuit area can be reduced, whereby the size of the semiconductor device can be reduced.

The structure of the semiconductor device described in this embodiment mode can be implemented by being freely combined with the structures of the semiconductor devices in other embodiment modes in this specification. In addition, as the memory circuit, a write-once memory, an EEPROM, a flash memory, or the like may be used.

Embodiment Mode 4

Figure 9:
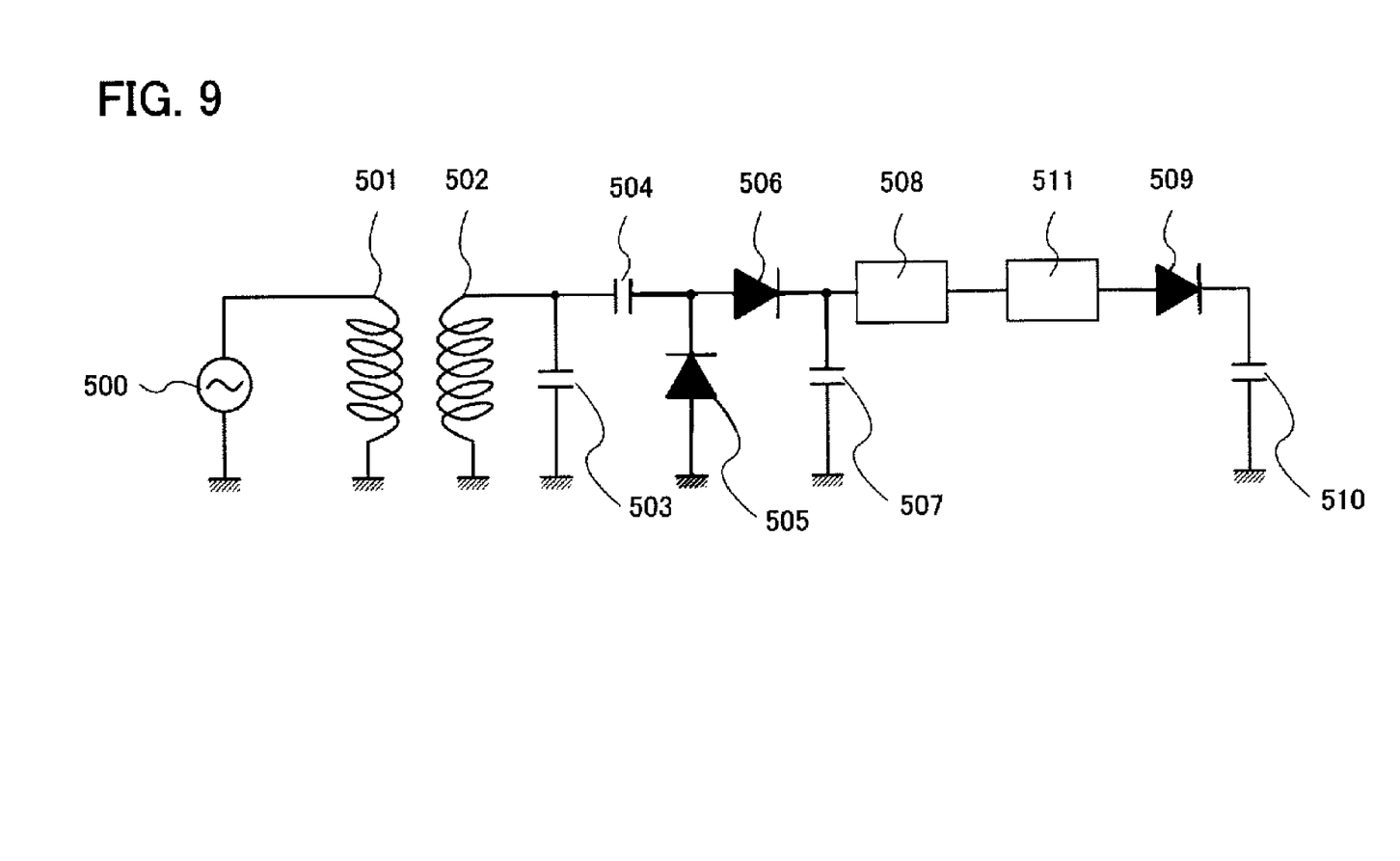
FIG. 9 is a diagram showing an example of a semiconductor device of the present invention.

This embodiment mode describes a structure of a battery (an RF (radio frequency) battery) capable of being charged wirelessly, which has a built-in boosting circuit, in the above-described embodiment mode with reference to FIG. 9. An RF battery (a non-contact battery using radio frequency) has features such as capability of charging-up an object without contact, superiority in portability, and the like.

As shown in FIG. 9, an RF battery includes a second antenna circuit 502, a resonant capacitor 503, a capacitor 504 of a rectifier circuit, a smoothing capacitor 507, a capacitor 510 for battery, diodes 505 and 506 which rectify an alternating signal, a diode 509 for backflow prevention, a regulator circuit 508, and a boosting circuit 511. In addition to these circuits, a sensor and the like may be included.

Next, operation of the RF battery is described with reference to FIG. 9.

Electric power output from the power supply 500 is oscillated through the first antenna circuit 501 and received by the second antenna circuit 502 of the RF battery. A resonant frequency of the received electric wave is tuned to a specific frequency using the resonant capacitor 503. Then, the received voltage is rectified using the capacitor 504, the first diode 505, and the second diode 506. After smoothing the waveform of the received voltage using the smoothing capacitor 507, the received voltage is stored in the capacitor 510 through the regulator.

The RF battery is not charged unless power source voltage (for example, 2 V) exceeds a certain threshold. Thus, there is a problem in that electric power thereof is not stored when voltage less than or equal to threshold voltage is input. Therefore, in the RF battery, the boosting circuit 511 is provided in a subsequent stage of the regulator or provided for a place, which is different from the regulator, over the same circuit, so that electric power can be stored even when voltage less than or equal to threshold voltage is input.

The structure of the semiconductor device described in this embodiment mode can be implemented by being freely combined with the structures of the semiconductor devices in other embodiment modes in this specification.

Embodiment Mode 5

This embodiment mode describes examples of the application of the semiconductor device capable of transmitting and receiving information wirelessly, in the above-described embodiment mode. The semiconductor device of the invention can be used for various applications, and can be applied to any product whose information such as history can be wirelessly obtained by the semiconductor device so that the information can be effectively utilized for production, management, and the like of the product. For example, the semiconductor device of the invention can be applied to bills, coins, securities, documents, bearer bonds, packaging containers, books, storage media, personal belongings, means of transportation, foods, clothes, healthcare items, daily commodities, medicines, electronic devices, and the like. Examples of such application will be described with reference to FIGS. 10A to 10H.

Figure 10A:
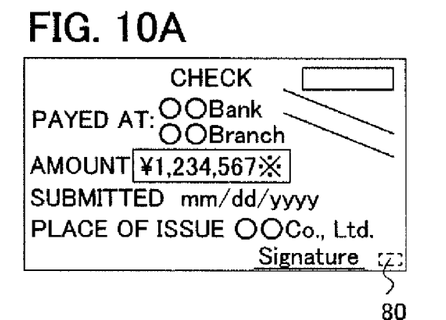
FIGS. 10A to 10H are views each showing an example of a usage of a semiconductor device of the present invention.
Figure 10B:
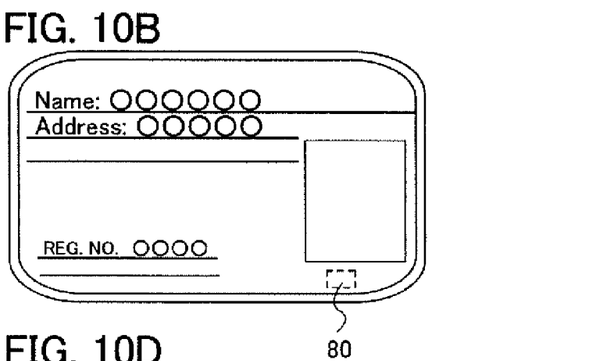
Figure 10C:
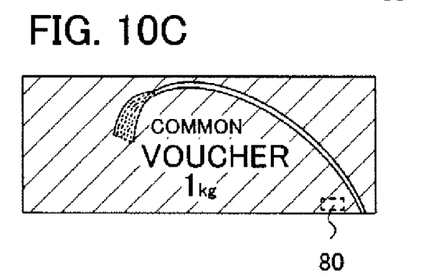
Figure 10D:
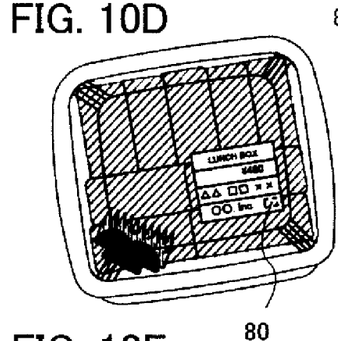
Figure 10E:
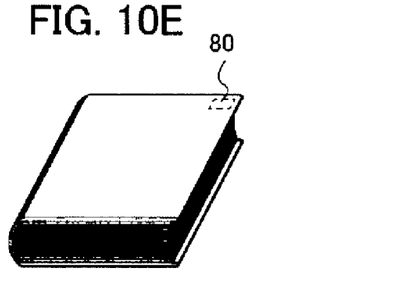
Figure 10F:
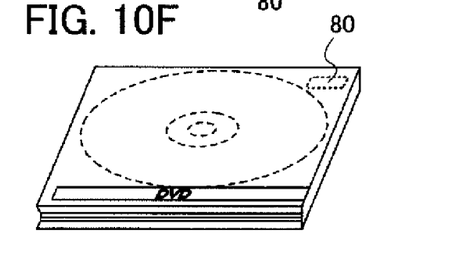
Figure 10G:
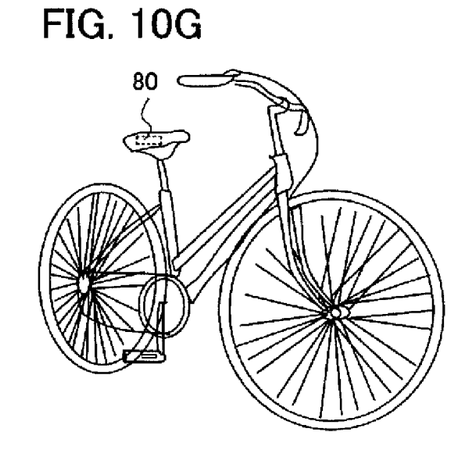
Figure 10H:
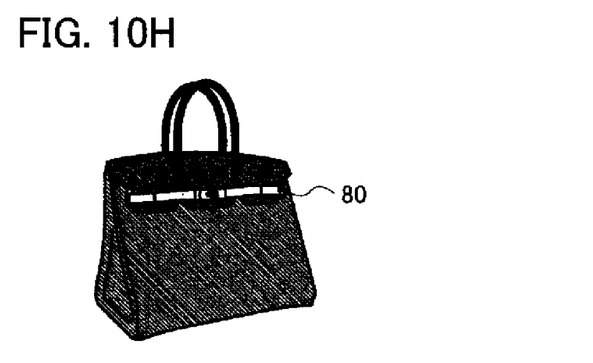

The bills and coins are currency in the market and include notes that are circulating as the real money in specific areas (cash vouchers), memorial coins, and the like. The securities include checks, certificates, promissory notes, and the like (FIG. 10A). The documents include driver's licenses, resident's cards, and the like (FIG. 10B). The bearer bonds include stamps, rice coupons, various gift coupons, and the like (FIG. 10C). The packaging containers include paper for wrapping a lunch box or the like, plastic bottles, and the like (FIG. 10D). The books include documents and the like (FIG. 10E). The storage media include DVD software, video tapes, and the like (FIG. 10F). The means of transportation include wheeled cycles or vehicles such as bicycles, vessels, and the like (FIG. 10G). The personal belongings include shoes, glasses, and the like (FIG. 10H). The foods include food items, beverages, and the like. The clothes include clothing, footwear, and the like. The healthcare items include medical devices, health appliances, and the like. The daily commodities include furniture, lighting apparatuses, and the like. The medicines include medicament, agricultural chemicals, and the like. The electronic devices include liquid crystal display devices, EL display devices, television devices (television receivers or thin television receivers), mobile phones, and the like.

When a semiconductor device 80 is provided for bills, coins, securities, documents, bearer bonds, and the like, forgery thereof can be prevented. In addition, when the semiconductor device 80 is provided for packaging containers, books, storage media, personal belongings, foods, daily commodities, electronic devices, and the like, the efficiency of an inspection system, a rental shop system, and the like can be improved. Further, when the semiconductor device 80 is provided for means of transportation, healthcare items, medicines, and the like, forgery and theft thereof can be prevented and wrong use of the medicines can be prevented. The semiconductor device 80 may be provided by, for example, being attached to the surface of an object or embedded in an object. For example, the semiconductor device 80 may be embedded in paper of a book or embedded in an organic resin of a package.

In this manner, when the semiconductor device is provided for packaging containers, storage media, personal belongings, foods, clothing, daily commodities, electronic devices, and the like, the efficiency of an inspection system, a rental shop system, and the like can be improved. In addition, when the semiconductor device is provided for means of transportation, forgery and theft thereof can be prevented. Further, when the semiconductor device is implanted in creatures such as animals, identification of the individual creature can be easily carried out. For example, when the semiconductor device is implanted in creatures such as domestic animals, not only the year of birth, sex, breed, and the like but also health conditions such as body temperature can be easily managed. In particular, by using the semiconductor device in the above-described embodiment mode, reduction in size of the semiconductor device can be realized, and accordingly, the semiconductor device can be provided for these articles so as not to be noticeable.

The method for manufacturing the semiconductor device described in this embodiment mode can be applied to the semiconductor device in other embodiment modes described in this specification.

This application is based on Japanese Patent Application serial No. 2006-354427 filed with Japan Patent Office on Dec. 28, 2006, the entire contents of which are hereby incorporated by reference.

What is claimed is:

1. A semiconductor device including a boosting circuit, the boosting circuit comprising:
   a plurality of rectifying elements connected in series between an input terminal portion and an output terminal portion of the boosting circuit, each of the rectifying elements including an input portion and an output portion, with an input portion of a first one of the rectifying elements being connected to the input terminal portion; and
   a plurality of capacitor elements each including a first electrode, a second electrode, and an insulating film interposed between the first electrode and the second electrode,
   wherein the first electrode of a first one of the plurality of capacitor elements is connected to an output portion of the first one of the plurality of rectifying elements,
   wherein the first electrode of a k-th one of the plurality of capacitor elements is connected to an output portion of a k-th one of the rectifying elements and to an input portion of a (k+1)th one of the rectifying elements (where k is an integer of $2 \leq k \leq (n-1)$), wherein only the first one of the plurality of capacitor elements does not comprise a semiconductor film as the first electrode and the second electrode, and wherein the first electrode of at least another one of the plurality of capacitor elements comprises a first conductive film and the second electrode of at least another one of the plurality of capacitor elements comprises a semiconductor film.

2. The semiconductor device according to claim 1, wherein the first electrode of the second capacitor element comprises the first conductive film and the second electrode of the second capacitor element comprises the semiconductor film.

3. The semiconductor device according to claim 1, further comprising a first wiring and a second wiring, wherein the second electrode of one of the plurality of capacitor elements is connected to one of the first wiring and the second wiring, and the second electrode of an adjacent one of the plurality of capacitor elements is connected to the other one of the first wiring and the second wiring.

4. The semiconductor device according to claim 3, wherein the first wiring is configured to supply a first signal and the second wiring is configured to supply a second signal which is an inverse of the first signal.

5. The semiconductor device according to claim 1, wherein the insulating film of the another one of the plurality of capacitor elements is thinner than the insulating film of the first one of the plurality of capacitor elements.

6. The semiconductor device according to claim 1, wherein each of the plurality of the rectifying elements comprises a diode-connected thin film transistor having a gate electrode that comprises the first conductive film.

7. The semiconductor device according to claim 1, wherein the boosting circuit is formed by using an SOI substrate.

8. A semiconductor device including a boosting circuit, the boosting circuit comprising:

at least first, second and third rectifying elements connected in series between an input terminal portion and an output terminal portion of the boosting circuit, each of the rectifying elements including an input portion and an output portion, with an input portion of the first one of the rectifying elements being connected to the input terminal portion; and at least first and second capacitor elements each including a first electrode, a second electrode, and an insulating film interposed between the first electrode and the second electrode, wherein the first electrode of the first capacitor element is connected to an output portion of the first rectifying element, wherein the first electrode of the second capacitor element is connected to an output portion of the second rectifying element and to an input portion of the third rectifying element, wherein only the first capacitor element does not comprise a semiconductor film as the first electrode and the second electrode, and wherein the first electrode of the second capacitor element comprises a first conductive film and the second electrode of the second capacitor element comprises a semiconductor film.

9. The semiconductor device according to claim 8, further comprising a first wiring and a second wiring, wherein the second electrode of one of the first and the second capacitor elements is connected to one of the first wiring and the second wiring, and the second electrode of an adjacent one of the first and the second capacitor elements is connected to the other one of the first wiring and the second wiring.

10. The semiconductor device according to claim 9, wherein the first wiring is configured to supply a first signal and the second wiring is configured to supply a second signal which is an inverse of the first signal.

11. The semiconductor device according to claim 8, wherein the insulating film of the second capacitor element is thinner than the insulating film of the first capacitor element.

12. The semiconductor device according to claim 8, wherein each of the plurality of the rectifying elements comprises a diode-connected thin film transistor having a gate electrode that comprises the first conductive film.

13. The semiconductor device according to claim 8, wherein the boosting circuit is formed by using an SOI substrate.

* * * * *